United States Patent

[11] 3,623,734

[72] Inventors Naraji Sakamoto
Toyonaka-shi;
Toshiyuki Goto, Kadoma-shi, both of Japan

[21] Appl. No. 858,357
[22] Filed Sept. 16, 1969
[45] Patented Nov. 30, 1971
[73] Assignee Matsushita Electric Industrial Co., Ltd.
Kadoma-shi, Osaka, Japan
[32] Priority Sept. 21, 1968
[33] Japan
[31] 43/68616

[54] PICK-UP DEVICE FOR RECORD PLAYERS
11 Claims, 9 Drawing Figs.

[52] U.S. Cl. .......... 274/1 R, 274/23
[51] Int. Cl. .......... G11b 3/10
[50] Field of Search .......... 274/1, 23

[56] References Cited

UNITED STATES PATENTS

| | | | |
|---|---|---|---|
| 1,344,186 | 6/1920 | Morrison | 274/34 |
| 1,990,548 | 2/1935 | Keller et al. | 274/1 |
| 2,246,296 | 6/1941 | Di Toro | 274/1 |
| 2,489,062 | 11/1949 | Tompson | 274/1 |

*Primary Examiner*—Harry N. Haroian
*Attorney*—Stevens, Davis, Miller & Mosher

ABSTRACT: A pickup device for record players which enables a stylus under a light pressure to perfectly trace the grooves on a disc even if the disc is warped or eccentric, whereby high-fidelity reproduction of the recorded sound can be obtained.

N. SAKAMOTO &
T. GOTO INVENTORS

BY Stevens, Davis, Miller & Mosher ATTORNEYS

PICK-UP DEVICE FOR RECORD PLAYERS

This invention relates to a pickup device for record players, and more particularly to a pickup device which enables a stylus under a light pressure to perfectly trace the grooves on a disc even if the disc is warped or eccentric, whereby high-fidelity reproduction of the recorded sound can be obtained.

Generally, a pickup device for high-fidelity reproduction of a recorded sound must be operated under a light stylus pressure. However, if the disc to be played is warped or eccentric as is often the case, the light stylus pressure is likely to cause the stylus to skip over grooves on the disc or result in distortion is the reproduced sound. Also, it is often experienced that if the record player itself trembles due to receiving external vibrations or shocks, it causes the stylus under a light pressure to skip over grooves on the disc.

It is therefore the primary object of the present invention to provide a pickup device for record players which comprises a detector portion for detecting the relationship between a disc and the pickup, an amplifier for amplifying a signal detected by the said detector portion, and an operating portion operable to maintain the pickup always in normal relationship with the disc, the said amplifier portion driving the said operating portion in accordance with the said detected signal and a feedback signal imparted through a characteristic compensating circuit. The pickup device thus provided according to the present invention eliminates the above-mentioned drawbacks inherent to the prior art pickup devices and ensures high-fidelity reproduction of the recording on the disc at all times.

Figure 1:
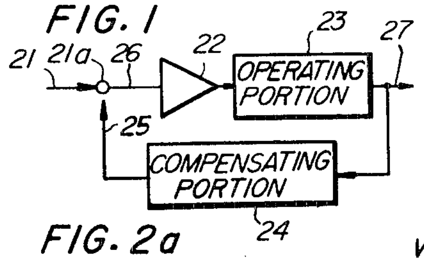
Figure 2A:
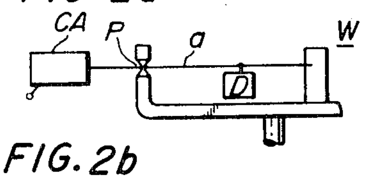
Figure 2B:
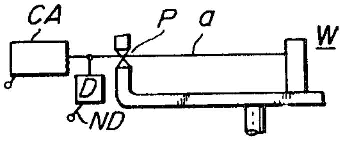
Figure 2C:
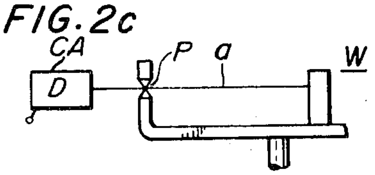
Figure 3A:
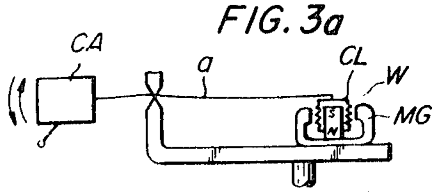
Figure 3B:
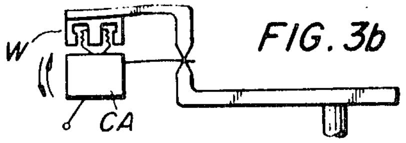
Figure 4A:
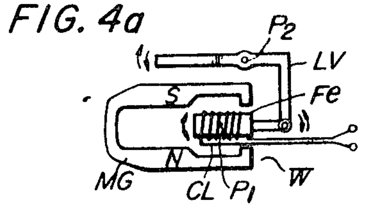
Figure 4B:
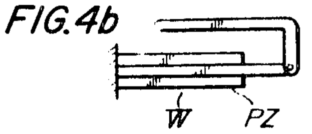
Figure 5:
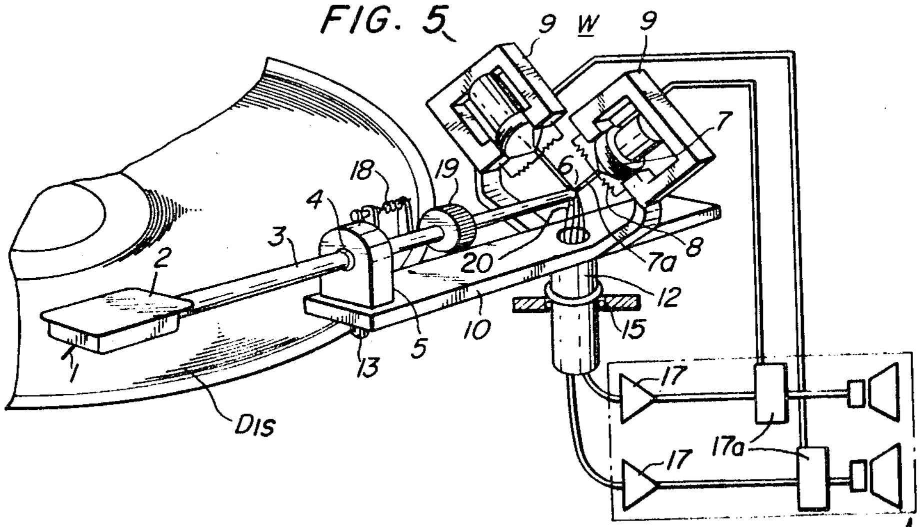

The present invention will now be described in detail with reference to the accompanying drawings, in which:

FIG. 1 is a block diagram of the pickup device for record players according to an embodiment of the present invention;

FIGS. 2*a*, 2*b* and 2C show, in schematic diagram, various examples of the detector portion incorporated in the pickup device of FIG. 1;

FIGS. 3*a*, 3*b*, 4*a* and 4*b* are schematic diagrams showing examples of the operating portion incorporated in the pickup device of FIG. 1; and FIG. 5 is a combined perspective view and block diagram of the device according to the present invention.

Description will first be made of the principle of the present invention with reference to FIG. 1. In general, a normally operating pickup maintains a constant distance from a disc by taking a balanced position depending on the stylus pressure with the aid of the compliance inherent to the stylus portion. If the disc is warped or eccentric, a deviation from the balanced state will be caused in the relationship between the disc and the pickup, that is, in the relationship in terms of force, position, velocity, acceleration and so on between the two members. Such a deviation is represented by a signal 21 in FIG. 1. This deviation signal 21 means a deviation in one or more of the factors such as the pressure exerted on the disc by the cartridge stylus, i.e. the balance of force between the stylus and the disc, the distance between the disc and the pickup, the velocity of the pickup relative to the disc, and so on. The relationship between the disc and the pickup includes components in the direction vertical to the disc surface and/or in the radial directions of the disc, as well as in the two directions which are both at an angle of 45° with respect to the disc surface while they are perpendicular to each other. The deviation signal 21 is detected by a detector portion 21*a*, and a signal 26 thus detected is amplified by an amplifier portion 22 to drive an operating portion 23 so that the pickup is operated in such a manner as to negate the deviation. The movement of the pickup is fed back as a feedback signal 25 to the detector portion 21*a*, where the detected signal 26 and the feedback signal 25 negate each other or operate the pickup until the deviation is nullified. The feedback signal 25 is compensated for by a characteristic compensating circuit 24 inserted to improve the operating characteristic of the system. This characteristic compensating circuit 24 may be either of the differential-integrating type or of the proportional type or may comprise the combination of these two types. The circuit 24 may also be constructed mechanically. The pickup is operated so that the difference between the deviation represented by the deviation signal 21 and the amount of the operation of the pickup represented by the feedback signal 25, that is, the detected signal 26 may always be very small, and thus the pickup always maintains a position 27 which is at a predetermined distance from the disc surface.

The present invention will now be described with respect to the concrete arrangement thereof. Basically, a cartridge portion smoothly moving relative to the disc and an operating portion operating the cartridge portion are mounted on a tone arm which is so constructed as to allow the stylus of the cartridge portion to smoothly move along the grooves formed on the disc surface. A detector portion is provided to detect the relative positional relationship between the cartridge portion and the disc, and an amplifier portion is provided to amplify the signal detected by the detector portion and impart it to the operating portion.

This basic construction will further be described with respect to FIGS. 2*a*, 2*b* and 2*c*, each showing an example of the combination of a detector and pickup. In FIG. 2*a*, a detector portion D is supported at a supporting point P and detects the movement of an arm *a* operating a cartridge CA. In FIG. 2*b*, a contact needle ND contacting the detector portion D is provided to detect the relationship with the disc surface. In FIG. 2*c*, the cartridge CA itself may be used as the detector portion D. In the case of FIGS. 2*a* and 2*b*, use may be made of a transducing mechanism comprising photoelectric means, electrostatic means, piezoelectric means, electromagnetic means, differential transformer means or other means.

Referring to FIGS. 3*a*, 3*b*, 4*a* and 4*b*, there are shown four examples of the operating portion. In FIG. 3*a*, the operating portion W is of such a construction that the operating arm *a* is operated by electromagnetic means of the dynamic type comprising a magnet MG and a coil CL. In FIG. 3*b*, the cartridge CA is operated by the same electromagnetic means of the dynamic type as shown in FIG. 3*a*. In FIG. 4*a*, a ferrous member Fe supported at a supporting point $P_1$ within the magnetic field of a magnet MG and having a coil CL wound thereon is provided to form electromagnetic means of the magnetic type which transmits the movement of the ferrous member Fe to a lever LV supported at a suppporting point $P_2$. In FIG. 4*b*, use may be made of piezo-electric means utilizing the deformation of a piezo-electric element PZ. Means for connecting the cartridge CA and the operating portion W may be of the lever-connection type as shown in FIG. 3*a* or of the direct-connection type such as pivotal connection as shown in FIG. 3*b*. Preferably, a fluid damper may be used with the mechanical system to effect the characteristic compensation, or the power of the transducer for converting electrical energy into mechanical energy in the operating portion W and the equivalent mass of the operating portion W may be suitably selected so as to constitute a mechanical filter for reducing the frequency response of the operating portion W in the audio range.

The amplifier may be one which can produce an output sufficient to drive the operating portion W. A low pass filter circuit may preferably be added so that the operating portion W may be operated at a frequency below the audio range. It is further possible to utilize the audio amplifier for reproducing the recorded sound as the amplifier for the operating portion, and thereby drive the operating portion W directly or through the filter.

Referring to FIG. 5, an example of the pickup device according to the present invention is shown partly in perspective view and partly in block diagram. A cartridge 2 having a stylus 1 is mounted on arm 10 by means of a tone arm 3, a free supporting pivot 4 and a supporting bed 5. The arm 10 has an operating portion W mounted thereon. The operating portion W comprises two electromagnetic type transducers 9 each provided with a moving coil 7 and a lever 7*a* transmitting the movement of the moving coil 7 to a point 6 of the tone arm 3. The moving coils 7 are positioned in the magnetic gap by center holders 8. The arm 10 is supported by a shaft 12 and a bearing 15 in such a manner that the arm may freely rotate along the surface of the disc. Before and after the disc is played, the cartridge 2 must be raised and lowered to the disc surface by hand so that the tone arm 3 can be tilted in every direction by means of the free supporting pivot 4 on the bed 5 fixed on the arm 10 with a screw bolt 13. It is needless to say that vertical movement of the cartridge 2 over a small distance may be accomplished by passing or interrupting a direct current to the moving coils 7 instead of by hand. In this case, the cartridge can be lowered gently onto the disc by the use of a power source which discharges in accordance with the time constant of the capacitor-resistor circuit. Adjustment of the stylus pressure may be accomplished by adjusting the tension of a spring 18 while displacing a weight 19. Numeral 17 denotes amplifiers.

With the above-described arrangement, if the disc is warped enough to raise the stylus 1 abruptly, then the cartridge 2 is raised with the compliance force of elastomer which holds the stylus in the cartridge 2. The difference in masses between the stylus 1 and the cartridge 2 results in a difference in movement with respect to each other. Thus the movement of the cartridge 2 is small while the movement of the stylus relative to the cartridge 2 is great. Therefore, the movement of the stylus 1 relative to the cartridge 2 caused by the warped disc is converted into an electromotive force by the transducer mechanism in the cartridge and transmitted to the amplifiers 17 and matrix circuit 17*a* through lead wires 20, where the electromotive force is amplified to provide a power to drive the moving coils 7 of the operating portion W, and also the amplifiers 17 work as audio amplifiers. The matrix circuit 17*a* separates the signal from the output of the amplifier 17 and sends the signal compensated by the differential or integral circuit therein to the operating portion W and also sends the audio signals to the loud speakers. The movement of the moving coils 7 is transmitted through the lever 7*a* to the tone arm 3, which is thereby moved in such a direction as to raise the cartridge 2. As a result, the raising of the stylus 1 caused by the warped disc is negated by the raising of the cartridge 2 and thereby the stylus 1 can maintain its proper position in the cartridge 2. If the gramophone in use is a 45° –45° type stereo system, any vertical movement of the disc (resulting from the warping of the disc) and/or any horizontal movement of the disc (resulting from the eccentricity of the disc) may be detected as respective components of movement by the cartridge disposed in accord with the 45°–45° system, and therefore the moving coils in the operating portion may be arranged in a corresponding 45° –45° manner. It is also possible to set an upper limit to the response frequency of the electrical system or the mechanical system in order to prevent the response frequency for the operating portion of the tone arm from reaching the audio range to reduce the output of the grooves in the audio range.

As will be apparent from the foregoing description, the present invention enables the stylus under a light pressure to accurately trace the grooves on the disc even if the disc is warped or eccentric, and this ensures high-fidelity reproduction of the disc at all times.

What is claimed is:

1. A pickup device for record players, comprising: a tone arm having a phonograph cartridge on one end; means detecting a differential from a predetermined normal relationship between said cartridge and a disc surface; means amplifying the difference signal detected by said detecting means; means operating to maintain said cartridge in said predetermined normal relationship; wherein said amplifying means drives said operating means in accordance with said detected signal and a feedback signal imparted through means, including a characteristic compensating circuit, for compensating the movement of said cartridge relative to said disc surface.

2. A pickup device according to claim 1, wherein said detector portion is a cartridge for reproducing the sound recorded on the disc.

3. A pickup device according to claim 1, wherein said detecting means comprises means for detecting the relationship between the disc and the cartridge by the displacement of said tone arm.

4. A pickup device according to claim 1, wherein said detecting means comprises means having a probe for detecting the relationship between the disc and the cartridge.

5. A pickup device according to claim 1, wherein said relationship between the disc and the pickup includes at least one of such factors as the pressure of the cartridge stylus exerted on the disc, the distance between the disc and the cartridge, and the velocity of the cartridge relative to the disc.

6. A pickup device according to claim 1, wherein the direction of said relationship includes at least one of a component vertical to the surface of the disc and a radial component of the disc.

7. A pickup device according to claim 1, wherein said relationship consists in a set of two directions forming an angle of 45° with respect to the surface of the disc and perpendicular to each other.

8. A pickup device according to claim 1, wherein said characteristic compensating circuit is at least one of the differential-integrating type and of the proportional type.

9. A pickup device according to claim 1, wherein said characteristic compensating circuit comprises a mechanical system.

10. A pickup device according to claim 1, wherein said amplifying means is an amplifier for reproducing sound.

11. A pickup device according to claim 1, further comprising means setting an upper limit to the frequency response of said operating means to prevent the response frequency of said operating means from reaching the audio range to reduce the output of sound in said audio range.

* * * * *